(12) United States Patent
Chang

(10) Patent No.: US 8,111,750 B2
(45) Date of Patent: Feb. 7, 2012

(54) SYSTEM AND METHOD FOR 3-D RECURSIVE SEARCH MOTION ESTIMATION

(75) Inventor: Fang-Chen Chang, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1358 days.

(21) Appl. No.: 11/723,488

(22) Filed: Mar. 20, 2007

(65) Prior Publication Data

US 2008/0232642 A1 Sep. 25, 2008

(51) Int. Cl.
*H04N 11/02* (2006.01)

(52) U.S. Cl. ............... 375/240.12; 375/240.16

(58) Field of Classification Search .......... None
See application file for complete search history.

(56) References Cited

U.S. PATENT DOCUMENTS

| | | | | |
|---|---|---|---|---|
| 5,594,504 A * | 1/1997 | Ebrahimi | ........... | 375/240.16 |
| 7,773,670 B1 * | 8/2010 | Puri et al. | ........... | 375/240.01 |
| 7,782,955 B2 | 8/2010 | Chen et al. | | |
| 7,852,938 B2 * | 12/2010 | Shi et al. | ........... | 375/240.16 |
| 2004/0258154 A1 * | 12/2004 | Liu et al. | ........... | 375/240.16 |
| 2005/0053137 A1 * | 3/2005 | Holcomb | ........... | 375/240.16 |
| 2005/0053294 A1 * | 3/2005 | Mukerjee et al. | ........... | 382/236 |
| 2006/0239348 A1 * | 10/2006 | Zhang et al. | ........... | 375/240.12 |
| 2007/0064806 A1 * | 3/2007 | Paniconi et al. | ........... | 375/240.16 |

FOREIGN PATENT DOCUMENTS

| | | |
|---|---|---|
| TW | 474105 | 1/2006 |
| TW | 200601188 A | 1/2006 |
| TW | 200629903 A | 8/2006 |
| TW | 200714080 A | 4/2007 |

* cited by examiner

*Primary Examiner* — Ponnoreay Pich
(74) *Attorney, Agent, or Firm* — Rabin & Berdo, P.C.

(57) ABSTRACT

A method for 3-D recursive search motion estimation is provided to estimate a motion vector for a current block in a current frame. The method includes the following steps. First, provide a spatial prediction by selecting at least one motion vector for at least one neighboring block in the current frame. Then, provide a temporal prediction. After that, estimate the motion vector for the current block based on the spatial prediction and the temporal prediction. The temporal prediction is obtained by selecting at least one most frequent motion vector from a plurality of motion vectors for a plurality of blocks in a corresponding region of a previous frame, wherein the corresponding block encloses a previous block which is location corresponding to the current block in the current frame.

16 Claims, 3 Drawing Sheets

SYSTEM AND METHOD FOR 3-D RECURSIVE SEARCH MOTION ESTIMATION

BACKGROUND OF THE INVENTION

1. Field of the Invention

The invention relates in general to motion estimation, and more particularly to 3-D recursive search motion estimation using statistic temporal prediction.

2. Description of the Related Art

Conventionally, through 3-D recursive search motion estimation including spatial prediction and temporal prediction, motion vectors for all blocks in a current frame can be obtained. Referring to FIG. 1, a schematic diagram illustrating temporal prediction used in the conventional 3-D recursive search motion estimation is shown. In FIG. 1, temporal prediction of a block 112 can be obtained by reference to motion vectors of the left-down block 104 and the right-down block 106 of a previous block 102 in a previous frame 100, which is location corresponding to the block 112.

However, the temporal prediction in FIG. 1 only refers to the motion vectors of the left-down and right-down blocks 104 and 106 of the previous block 112. Once the motion vectors of the left-down block 104 or the right-down block 106 has errors, the motion vector of the block 112 is very likely to have errors due to incorrect temporal prediction.

Besides, the temporal prediction in FIG. 1 also has to store motion vectors of all blocks in the previous frame 100, which in turn increases the memory cost. Therefore, a system and method for 3-D recursive search motion estimation, which includes accurate and cost-effective temporal prediction, is much demanded.

SUMMARY OF THE INVENTION

The invention is directed to a system and method for 3-D recursive search motion estimation, which is to solve the mentioned problems.

According to a first aspect of the present invention, A system for 3-D recursive search motion estimation is provided to estimate a motion vector for a current block in a current frame. The system includes a spatial predictor, a temporal predictor, and a motion estimator. The spatial predictor provides a spatial prediction by selecting at least one motion vector for at least one neighboring block in the current frame. The temporal predictor provides a temporal prediction by selecting at least one most frequent motion vector from a number of motion vectors for a number of blocks in a corresponding region of a previous frame, wherein the corresponding region encloses a previous block which is location corresponding to the current block in the current frame. The motion estimator estimates the motion vector for the current block based on the spatial prediction and the temporal prediction.

According to a second aspect of the present invention, a method for 3-D recursive search motion estimation is provided to estimate a motion vector for a current block in a current frame. The method includes the following steps. First, provide a spatial prediction by selecting at least one motion vector for at least one neighboring block in the current frame. Then, provide a temporal prediction. After that, estimate the motion vector for the current block based on the spatial prediction and the temporal prediction. The temporal prediction is obtained by selecting at least one most frequent motion vector from a plurality of motion vectors for a plurality of blocks in a corresponding region of a previous frame, wherein the corresponding block encloses a previous block which is location corresponding to the current block in the current frame.

The invention will become apparent from the following detailed description of the preferred but non-limiting embodiments. The following description is made with reference to the accompanying drawings.

DETAILED DESCRIPTION OF THE INVENTION

Figure 1:
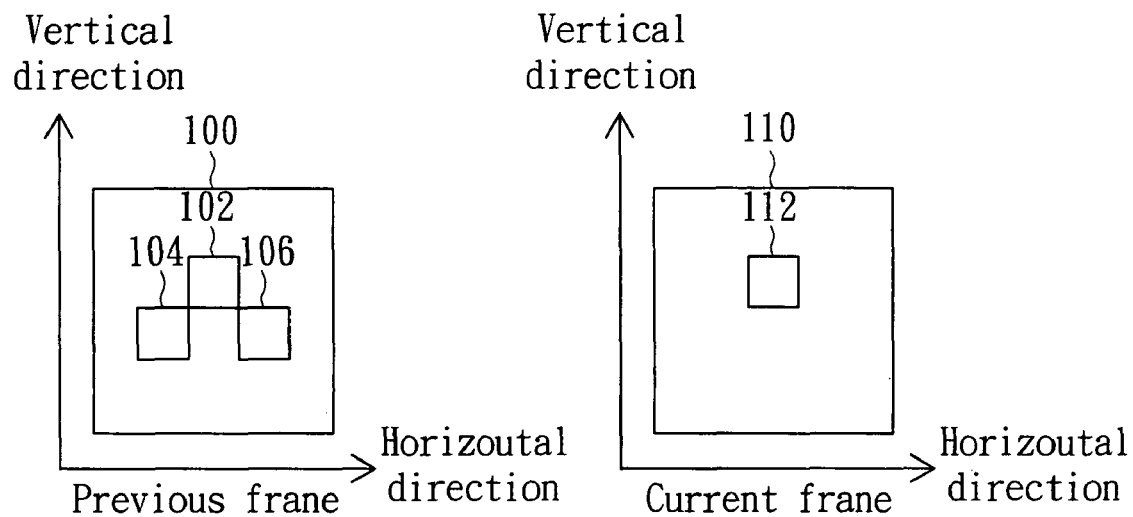
FIG. 1 is a schematic diagram illustrating temporal prediction used in the conventional 3-D recursive search motion estimation.

In the inventive system and method for 3-D recursive search motion estimation, each frame is segmented into one or more regions, and the histogram of motion vectors for all blocks within each region is analyzed respectively. To achieve the motion estimation of a block, the inventive system and method for 3-D recursive search motion estimation has the conventional temporal prediction as shown in FIG. 1 replaced by statistic temporal prediction, for example, the most frequent motion vector within the corresponding region of the previous frame.

Figure 2:
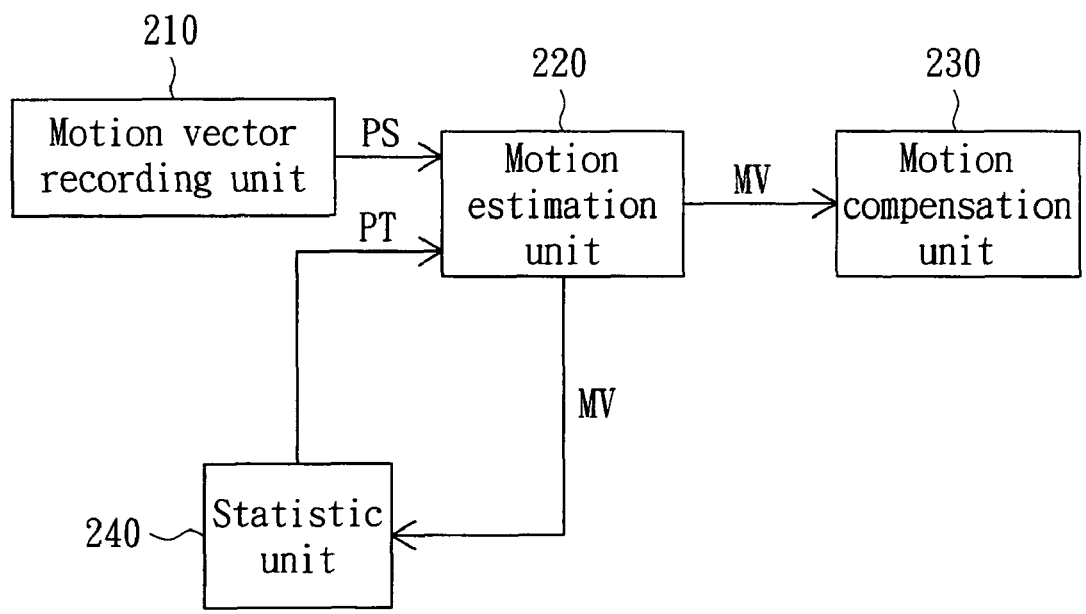
FIG. 2 is a block diagram showing a system for 3-D recursive search motion estimation according to a preferred embodiment of the invention.
Figure 3:
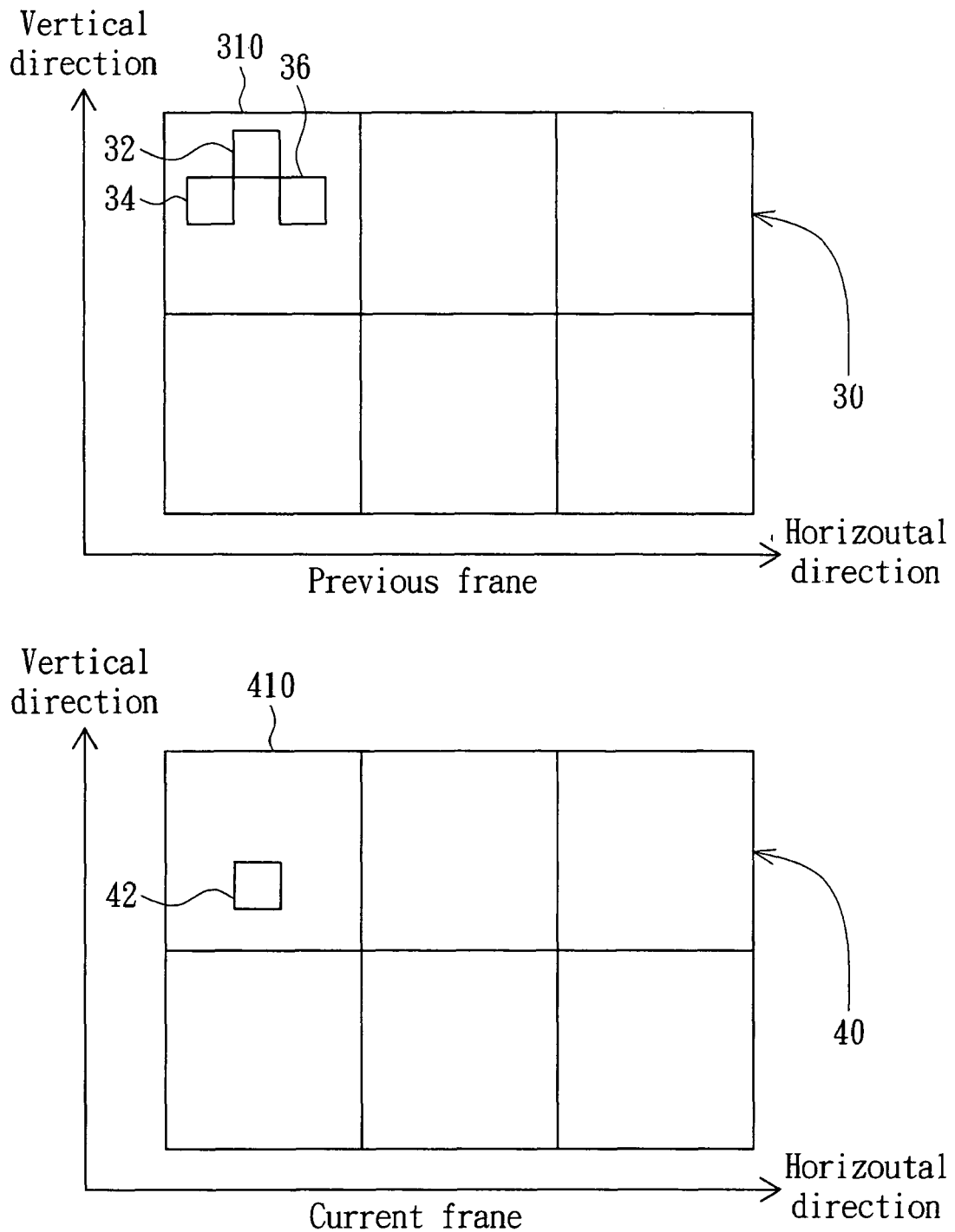
FIG. 3 is a schematic diagram illustrating temporal prediction used in the system for 3-D recursive search motion estimation as shown in FIG. 2.

Referring to FIG. 2 and FIG. 3, a block diagram showing a system for 3-D recursive search motion estimation according to a preferred embodiment of the invention and a schematic diagram illustrating temporal prediction used in the system for 3-D recursive search motion estimation as shown in FIG. 2 are respectively shown. As shown in FIG. 2, the system 200 for 3-D recursive search motion estimation has a spatial predictor 210, a temporal predictor 240 and a motion estimator 220, whose output may be transmitted to a motion compensator 230 for compensation. In one embodiment, as shown in FIG. 3, each frame such frame 30 or frame 40 is segmented into one or more regions, such as six regions 310~360 or six regions 410~460 arranged in a 2×3 matrix. In addition, more or less regions are also possible for various applications. Afterwards, the embodiment is exemplified by the motion estimation of a block 32.

The spatial predictor 210 is used to provide a spatial prediction PS for output to the motion estimator 220. For example, the spatial predictor 210 may use motion vectors of neighboring blocks, for example, the left-down block 34 and the right-down block 36, as the spatial prediction PS of the block 32. In addition, any other spatial prediction known to the skilled is also possible for various applications.

The temporal predictor 240 is used to analyze the histogram of motion vectors for all blocks within a corresponding region 410 of a previous frame 40, the corresponding region 410 of the previous frame 40 enclosing a previous block 42 location corresponding to the block 32, and uses the most frequent motion vector as the temporal prediction PT of the block 32. In addition, the most frequent motion vector may be selected as the temporal prediction only if the frequency of occurrences exceeds a threshold, for example, 50%.

Or, the temporal predictor 240 can only analyze the histogram of motion vectors for certain blocks within the corresponding region 410 to complete the temporal prediction. For example, only the blocks with small errors may be used for fast and accurate analysis of the histogram. For example, the errors may be implemented by the SADs (sum of absolute differences) between the blocks and the block 32.

In addition, the temporal predictor 240 can also add weights to motion vectors for certain blocks within the corresponding region 410 to improve the temporal prediction. For example, edging blocks, i.e., blocks with an edge may be further emphasized.

The motion estimator 220 is used to determine the motion vector MV of the block 32 by reference to the spatial prediction PS and temporal prediction PT. For example, the motion estimator 220 may determine the motion vector MV of the block 32 by matching multiple blocks selected based on the spatial prediction PS and the temporal prediction PT with the block 32.

Figure 4:
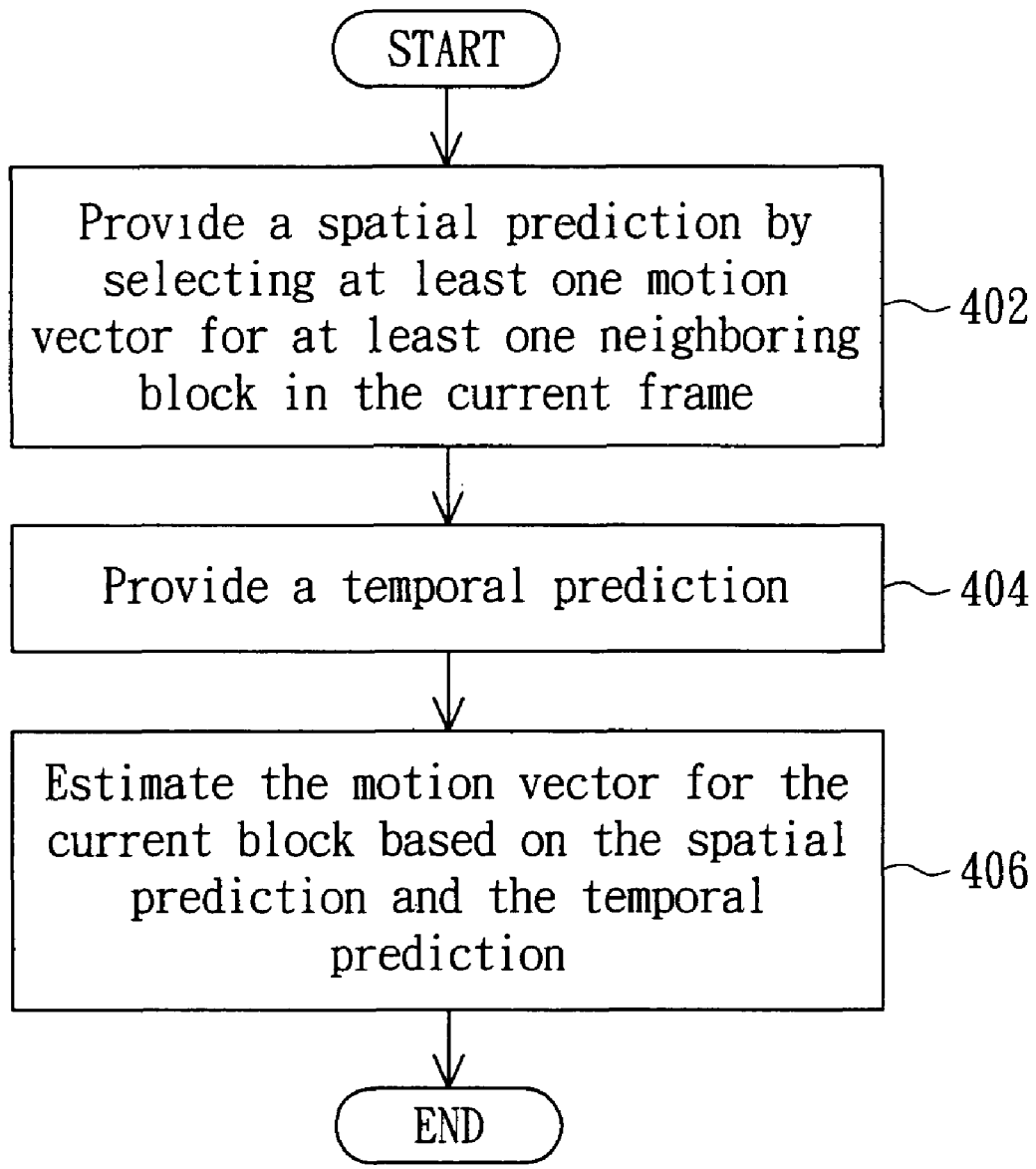
FIG. 4 is a flow chart illustrating a method for 3-D recursive search motion estimation according to an embodiment of the invention.

Referring to FIG. 4, a flow chart illustrating a method for 3-D recursive search motion estimation according an embodiment of the invention is shown. By reference to FIG. 3, the method is provided to estimate the motion vector of the block 32. First, in step 402, the spatial prediction PS of the block 32 is received, which may be motion vectors of the neighboring blocks, for example, the left-down block 34 and the right-down block 36 of the block 32.

Following that, in step 404, the temporal prediction PT of the block 32 is received, which may be obtained according to the histogram of motion vectors for all blocks within a corresponding region 410 of a previous frame 40, the corresponding region 410 of the previous frame 40 enclosing a previous block 42 location corresponding to the block 32. For example, the most frequent motion vector may be used as the temporal prediction PT of the block 32. In addition, the most frequent motion vector may be selected as the temporal prediction only if the frequency of occurrences exceeds a threshold, for example, 50%.

Or, the temporal prediction PT of the block 32 may be obtained according to the histogram of motion vectors for certain blocks within the corresponding region 410. For example, only the blocks with small errors may be used for fast and accurate analysis of the histogram. For example, the errors may be implemented by the SADs (sum of absolute differences) between the blocks and the block 32.

In addition, motion vectors for certain blocks, for example, edging blocks, within the corresponding region 410 may be emphasized to improve the temporal prediction.

Then, in step 406, the motion vectors MV of the block 32 is estimated according to the spatial prediction PS and temporal prediction PT of the block 32. For example, the motion vector MV of the block 32 may be estimated by matching multiple blocks selected based on the spatial prediction PS and the temporal prediction PT with the block 32.

In the aforementioned system and method for 3-D recursive search motion estimation, although the spatial prediction PS of the block 32 are exemplified to be the motion vectors of the left-down block 34 and right-down block 36 of the block 32, the spatial prediction is not limited thereto. The motion vectors of more/less blocks or elsewhere-located blocks can also be used as the spatial prediction PS.

Moreover, in the aforementioned system and method for 3-D recursive search motion estimation, although the frames 30 and 40 are respectively exemplified to have six regions 310~360 and 410~460 arranged in a 2×3 matrix, the segmentation of the frames 30 and 40 is not limited thereto. For example, the frames 30 and 40 can also be segmented into eight regions arranged in a 2×4 matrix. Or, the frames 30 and 40 can also be irregularly segmented based on the image objects within the frames.

Moreover, in the aforementioned system and method for 3-D recursive search motion estimation, since a statistic temporal prediction (the most frequent motion vector) is used, the motion vector MV of the block 32 can be less likely to have errors even when the motion vectors of certain neighboring blocks within the corresponding region of the previous frame have errors.

Moreover, in the aforementioned system and method for 3-D recursive search motion estimation, since the frames 30 and 40 are segmented into a limited number of regions, for example, six or eight regions, and only one statistic temporal prediction is required for each region, memory cost due to storage of motion vectors for all blocks in the previous frame 40 can be significantly reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A system for 3-D recursive search motion estimation, the system provided to estimate a motion vector for a current block in a current frame, comprising:
   a spatial predictor providing a spatial prediction by selecting at least one motion vector for at least one neighboring block in the current frame;
   a temporal predictor providing a temporal prediction by selecting at least one most frequent motion vector from a plurality of motion vectors for a plurality of blocks in a corresponding region of a previous frame, wherein the corresponding region encloses a previous block at a location corresponding to the current block in the current frame; and
   a motion estimator estimating the motion vector for the current block based on the spatial prediction and the temporal prediction, wherein at least one of the spatial predictor, the temporal predictor and the motion estimator is performed by a processor.

2. The system according to claim 1, wherein the at least one neighboring block is a left-down block or a right-down block previously transmitted in the current frame.

3. The system according to claim 1, wherein the temporal predictor further analyzes a histogram of motion vectors for all blocks in the corresponding region, and selects the most frequent motion vector as the temporal prediction.

4. The system according to claim 1, wherein the temporal predictor further analyzes a histogram of motion vectors for certain blocks in the corresponding region, and selects the most frequent motion vector as the temporal prediction, wherein the SADs (sum of absolute differences) between the certain blocks and the current block are small.

5. The system according to claim 3, wherein the most frequent motion vector is selected as the temporal prediction only if the frequency of occurrences exceeds a threshold.

6. The system according to claim 3, wherein the motion vectors for edging blocks are emphasized when the temporal predictor analyzes the histogram of motion vectors.

7. The system according to claim 4, wherein the motion vectors for edging blocks are emphasized when the temporal predictor analyzes the histogram of motion vectors.

8. The system according to claim 4, wherein the most frequent motion vector is selected as the temporal prediction only if the frequency of occurrences exceeds a threshold.

9. A method for 3-D recursive search motion estimation, the method provided to estimate a motion vector for a current block in a current frame, comprising the steps of:

providing a spatial prediction by selecting at least one motion vector for at least one neighboring block in the current frame;

providing a temporal prediction; and estimating the motion vector for the current block based on the spatial prediction and the temporal prediction;

wherein the temporal prediction is obtained by selecting at least one most frequent motion vector from a plurality of motion vectors for a plurality of blocks in a corresponding region of a previous frame, wherein the corresponding block encloses a previous block at a location corresponding to the current block in the current frame.

10. The method according to claim 9, wherein the at least one neighboring block is a left-down block or a right-down block previously transmitted in the current frame.

11. The method according to claim 9, wherein a histogram of motion vectors is analyzed for all blocks in the corresponding region, and the most frequent motion vector is selected as the temporal prediction.

12. The method according to claim 9, wherein a histogram of motion vectors is analyzed for certain blocks in the corresponding region, and the most frequent motion vector is selected as the temporal prediction, wherein the SADs (sum of absolute differences) between the certain blocks and the current block are small.

13. The method according to claim 11, wherein the most frequent motion vector is selected as the temporal prediction only if the frequency of occurrences exceeds a threshold.

14. The method according to claim 11, wherein the motion vectors for edging blocks are emphasized when the histogram of motion vectors is analyzed.

15. The method according to claim 12, wherein the motion vectors for edging blocks are emphasized when the histogram of motion vectors is analyzed.

16. The method according to claim 12, wherein the most frequent motion vector is selected as the temporal prediction only if the frequency of occurrences exceeds a threshold.

* * * * *